(12) United States Patent
Nishimura

(10) Patent No.: US 9,878,412 B2
(45) Date of Patent: Jan. 30, 2018

(54) ROTATION TABLE

(71) Applicant: FANUC Corporation, Yamanashi (JP)

(72) Inventor: Takuma Nishimura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 302 days.

(21) Appl. No.: 14/639,249

(22) Filed: Mar. 5, 2015

(65) Prior Publication Data

US 2015/0251286 A1    Sep. 10, 2015

(30) Foreign Application Priority Data

Mar. 10, 2014  (JP) .................................. 2014-046479

(51) Int. Cl.
| | | |
|---|---|---|
| B23Q 7/02 | (2006.01) | |
| B23Q 11/00 | (2006.01) | |
| B23Q 16/10 | (2006.01) | |
| B23Q 11/08 | (2006.01) | |
| B23Q 11/10 | (2006.01) | |

(52) U.S. Cl.
CPC ................ B23Q 7/02 (2013.01); B23Q 11/00 (2013.01); B23Q 11/0858 (2013.01); B23Q 11/0883 (2013.01); B23Q 16/10 (2013.01); B23Q 16/102 (2013.01); B23Q 16/105 (2013.01); B23Q 11/10 (2013.01); B23Q 2220/004 (2013.01); Y10T 74/1488 (2015.01); Y10T 74/1494 (2015.01); Y10T 279/1224 (2015.01)

(58) Field of Classification Search
CPC ............ B23Q 2220/004; B23Q 16/102; B23Q 16/105; B23Q 7/02; B23Q 11/0883; B23Q 11/0858; B23Q 16/10; B23Q 11/00; Y10T 74/1494; Y10T 74/1488; Y10T 279/1224
USPC ..... 74/813 L, 813 C, 826, 57, 606 R, 606 A; 29/235
See application file for complete search history.

(56) References Cited

U.S. PATENT DOCUMENTS 4,353,271 A * 10/1982 Pieczulewski ....... B23Q 16/102
                                                     74/813 L
4,721,017 A *  1/1988 Jorgensen ............. B23Q 16/06
                                                     269/70

(Continued)

FOREIGN PATENT DOCUMENTS

| JP | 2-7949 U | 1/1990 |
|---|---|---|
| JP | H027949 U | 1/1990 |

(Continued)

OTHER PUBLICATIONS

Fanuc Robodrill DDR manual; Jun. 2008; printed in USA.*

(Continued)

*Primary Examiner* — Larry E Waggle, Jr.
*Assistant Examiner* — Mahdi H Nejad
(74) *Attorney, Agent, or Firm* — Hauptman Ham, LLP

(57) ABSTRACT

A rotation table mounted on a machining table of a machine tool includes a clamping mechanism which is driven by air so as to clamp a rotation shaft, and an air purging pressure is applied into a casing so as to prevent a cutting fluid or foreign matter from intruding into the casing of the rotation table. Then, air discharged from the clamping mechanism does not pass through the casing, to which the air purging pressure is applied, and is discharged to the outside of the rotation table through a flow passage.

3 Claims, 3 Drawing Sheets

(56) References Cited

U.S. PATENT DOCUMENTS

| | | | | |
|---|---|---|---|---|
| 5,072,651 | A | * | 12/1991 | Kagita ................. B23Q 1/28 188/151 R |
| 5,090,950 | A | * | 2/1992 | Sugano ............. F16H 61/061 475/129 |
| 5,136,896 | A | * | 8/1992 | Burka ............. B23Q 16/026 279/5 |
| 5,234,081 | A | * | 8/1993 | Watanabe ........... B23Q 1/287 188/366 |
| 6,240,807 | B1 | * | 6/2001 | Hebener ............. B23Q 16/10 269/43 |
| 8,028,605 | B2 | * | 10/2011 | Duane ............. B23Q 16/102 74/813 C |
| 8,197,374 | B2 | * | 6/2012 | Iwasaki ............... F16D 55/40 475/116 |
| 8,366,579 | B2 | * | 2/2013 | Tokai ............. F16H 57/0447 475/160 |
| 9,533,392 | B2 | * | 1/2017 | Nishimura ......... G05B 19/4155 |
| 2003/0047412 | A1 | * | 3/2003 | Shiohara ............. B60T 13/66 192/109 F |
| 2009/0235783 | A1 | * | 9/2009 | Duane ............. B23Q 16/102 74/813 C |
| 2014/0326107 | A1 | * | 11/2014 | Itou ................. B23Q 3/18 74/813 C |
| 2015/0251286 | A1 | * | 9/2015 | Nishimura ........... B23Q 7/02 279/4.04 |

FOREIGN PATENT DOCUMENTS

| | | | |
|---|---|---|---|
| JP | 6-8108 A | | 1/1994 |
| JP | H11-267939 A | | 10/1999 |
| JP | H11267939 | * | 10/1999 |
| JP | H11267939 A | * | 10/1999 |
| JP | H11267939 A | * | 10/1999 |
| JP | 3013302 B2 | | 2/2000 |
| JP | 2007-32722 A | | 2/2007 |
| JP | 2014217895 A | * | 11/2014 |

OTHER PUBLICATIONS

Decision to Grant a Patent in JP application No. 2014-046479, dated Apr. 12, 2016.

Decision of Refusal in JP Application No. 2014-046479, dated Nov. 10, 2015.

Office Action dated Jul. 21, 2015, corresponding to Japanese patent application No. 2014-046479.

* cited by examiner

ROTATION TABLE

RELATED APPLICATIONS

The present application claims priority to Japanese Application Number 2014-046479, filed Mar. 10, 2014, the disclosure of which is hereby incorporated by reference herein in its entirety.

BACKGROUND OF THE INVENTION

1. Field of the Invention

The present invention relates to a rotation table that is mounted on a machining table of a machine tool.

2. Description of the Related Art

In recent years, a rotation table has been widely used in a machine tool. In many cases, the rotation table is particularly used for an indexing operation, and the indexing operation and the reliability of a clamping mechanism become important factors of the rotation table.

As a technique of an air purging mechanism of the rotation table, Japanese Patent Application Laid-Open No. 11-267939 discloses a technique in which purging air is partly supplied from air used in a clamping mechanism and air is discharged to the outside of a casing by an adjustment valve attached to the casing at the lower portion thereof when the pressure inside the rotation table becomes a predetermined pressure higher than the atmospheric pressure. Thus, the pressure inside the rotation table is normally maintained in a predetermined pressure higher than the atmospheric pressure.

FIG. 1 is a schematic diagram illustrating the entire configuration of a machine tool.

A rotation table 3 is used in a state where it is mounted on a machining table 2 disposed on a bed 7 of a machining center 1. In many cases, the rotation table 3 is exposed to a cutting fluid 5 ejected from a coolant nozzle 4. For that reason, there is a possibility that the cutting fluid 5 may intrude into the rotation table 3 so that electric parts or mechanical parts inside the rotation table are damaged. In order to prevent the damage, the pressure inside the rotation table 3 is maintained at a predetermined pressure (an air purging pressure) higher than the atmospheric pressure.

Incidentally, in a pneumatic drive type clamping mechanism mounted on the rotation table 3, a piston 6 is generally driven by air as illustrated in FIG. 2.

As illustrated in FIG. 2, the pneumatic drive type clamping mechanism is formed by two pressure chambers 22a and 22b respectively used for the clamping and unclamping operations through the piston 6. When air flows into the clamping pressure chamber 22a and the other unclamping pressure chamber 22b is released into the rotation table 3, the piston 6 moves toward the unclamping pressure chamber 22b. When the piston 6 is operated in the reverse direction, air flows into the unclamping pressure chamber 22b, and an air flow passage 26 is switched by an electromagnetic valve 8 so that the clamping pressure chamber 22a is released into the rotation table 3.

In this way, in the general rotation table 3, air is discharged into the rotation table 3 with the operation of the piston (see electromagnetic valve discharge ports 8a and 8b). For this reason, there is a case in which the pressure chambers released into the rotation table may communicate.

An example of an air purging structure is illustrated in FIG. 2. A supply port 26a is formed in the course of the passageway 26 so that purging air is partly supplied from the air used to drive the clamping mechanism. The supply port 26a is provided with a needle valve 9 which adjusts the amount of air flowing into the rotation table. Further, a drain hole 28 is formed in the casing 10 so as to release air supplied for air purging, and the drain hole 28 is also provided with a needle valve 11, thereby adjusting an outflow amount of the air.

The air purging pressure is generally about 0.01 MPa, but the air treated by the pneumatic drive type clamping mechanism is generally high so as to be 0.5 MPa. For this reason, when air is once discharged into the rotation table 3 by the clamping/unclamping operation, the pressure inside the rotation table 3 increases. Since the inside of the rotation table 3 is sealed due to the above-described reason, the pressure inside the rotation table 3 does not decrease promptly. When the clamping or unclamping operation is performed while the pressure inside the rotation table 3 is higher than the air purging pressure, the pressure chamber released into the rotation table communicates with the inside of the rotation table, and hence a phenomenon occurs in which the operation of the piston 6 becomes slower than the normal operation. When the clamping/unclamping operation is frequently performed in a short period of time, this problem becomes severe. When the clamping/unclamping operation is slow in the rotation table, the clamping mechanism may be damaged when a detection structure does not exist.

SUMMARY OF THE INVENTION

Therefore, in view of the above-described problems of the related art, an object of the invention is to provide a rotation table that is so structured as to stably perform a clamping operation regardless of the frequency of a clamping operation.

A first aspect of the rotation table according to the present invention includes a casing, a rotation shaft that is rotatably supported by the casing, and a clamping mechanism that is driven by air so as to clamp the rotation shaft, wherein a workpiece is attached to the rotation shaft at one end thereof, and an air purging pressure is applied into the casing so as to prevent a cutting fluid or foreign matter from intruding into the casing. The rotation table further includes a flow passage that connects the clamping mechanism to the outside of the casing and discharges air discharged from the clamping mechanism to the outside.

A second aspect of the rotation table according to the present invention includes a first casing, a rotation shaft that is rotatably supported by the first casing, and a clamping mechanism that is driven by air so as to clamp the rotation shaft, wherein a workpiece is attached to the rotation shaft at one end thereof, and an air purging pressure is applied into the first casing so as to prevent a cutting fluid or foreign matter from intruding into the first casing. The rotation table further includes a second casing which is provided adjacent to the first casing and to which the air purging pressure is not applied, and the second casing includes a hole communicating to the outside, and the rotation table further comprises a flow passage which connects the clamping mechanism to the second casing and discharges air discharged from the clamping mechanism to the second casing.

According to the invention, it is possible to provide the rotation table capable of preventing the damage of the clamping mechanism by stably performing the clamping operation regardless of the frequency of the clamping operation.

BRIEF DESCRIPTION OF THE DRAWINGS

The above and other objects and features of the present invention will be apparent from the following description of embodiments with reference to the accompanying drawings, in which.

DETAILED DESCRIPTION OF THE PREFERRED EMBODIMENTS

An embodiment of a rotation table according to the invention will be described with reference to FIGS. 3 to 5. Further, the same reference signs will be given to the components having the same or similar to those of the related art.

Figure 1:
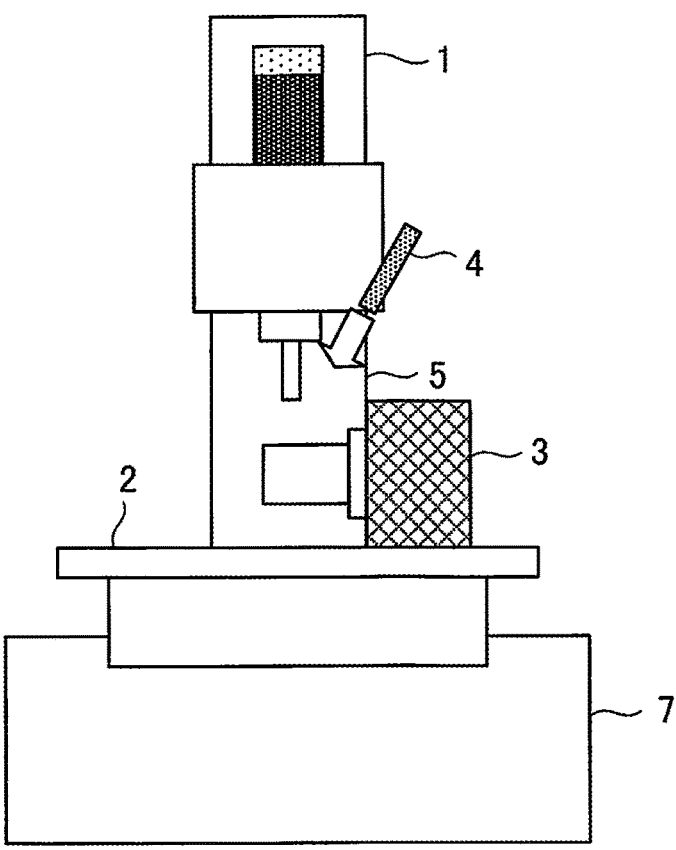
FIG. 1 is a schematic diagram illustrating the entire configuration of a machining center (a machine tool)

As illustrated in FIG. 1, a rotation table 3 is mounted on a machining table 2 inside a machining center 1 as a machine tool. An operation of indexing a workpiece attached to the rotation table is performed by an NC control.

The basic structure of the rotation table 3 will be described with reference to FIG. 3.

A shaft (a rotation axis) 12 is supported by a housing 13 fixed to a casing 10 through main bearings 14a and 14b in a rotatable manner. A motor 15 includes a stator 15a and a rotor 15b, and the stator 15a is fixed to the casing 10. Meanwhile, the rotor 15b is attached to the shaft 12, and supported so as to be rotatable with respect to the casing 10. An encoder 16, a cylinder 17, and a rear plate 18 are also fixed to the casing 10.

A brake disk 19 is coupled to one end of the shaft 12, and is operated so as to be rotatable with respect to the casing 10. Furthermore, the other end of the shaft 12 is coupled to a table that places a workpiece thereon or is provided with means (a bolt hole into which a fixing bolt is threaded) for directly fixing the workpiece. More specifically, a table may be fixed to the shaft 12 (rotation axis) at one end thereof and a workpiece may be attached to the table, or the workpiece may be directly attached to the shaft 12 (the rotation axis).

The piston 6 is adapted to move forward and backward inside the cylinder 17 through sealing members 20a, 20b, and 20c, and several springs 21 are disposed so that the piston 6 is biased in the clamping direction. The inside of the cylinder 17 is divided into a clamping pressure chamber 22a and an unclamping pressure chamber 22b through the piston 6 so that the piston 6 is movable by compressed air.

A flow passage 26 is controlled by an electromagnetic valve 8 so that compressed air flows to the clamping pressure chamber 22a when the shaft 12 is clamped whereas compressed air flows to the unclamping pressure chamber 22b when the shaft 12 is unclamped. When a clamping instruction is input, compressed air flows to the clamping pressure chamber 22a, the piston 6 is operated toward the brake disk 19, and the brake disk 19 is nipped between the piston 6 and the rear plate 18, so that the shaft 12 is not rotatable.

When an unclamping instruction is input, compressed air reversely flows to the unclamping pressure chamber 22b and the piston 6 moves in the reverse direction. Accordingly, the brake disk 19 is released from the piston 6 and the shaft 12 is rotatable.

Figure 2:
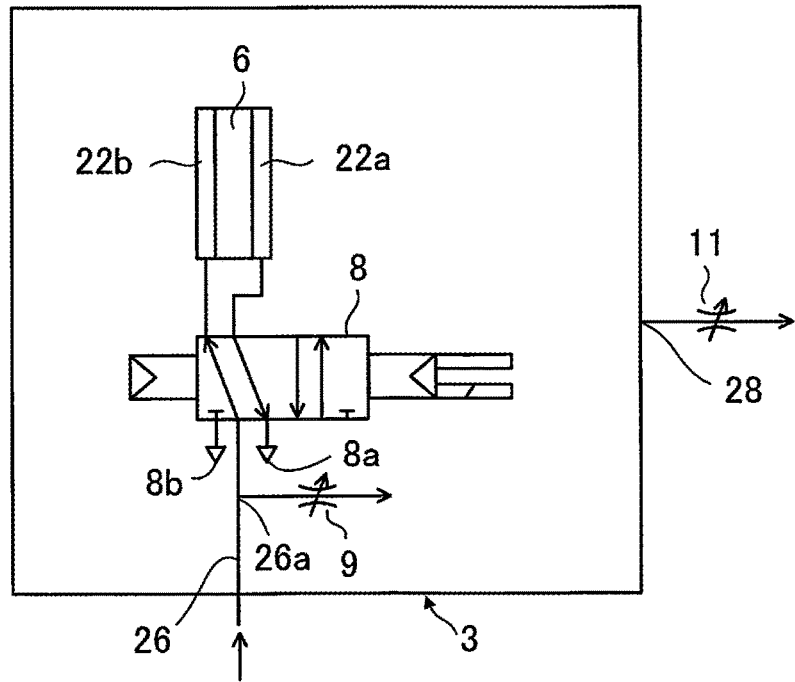
FIG. 2 is a schematic diagram illustrating a rotation table used in the machine tool of FIG. 1.
Figure 3:
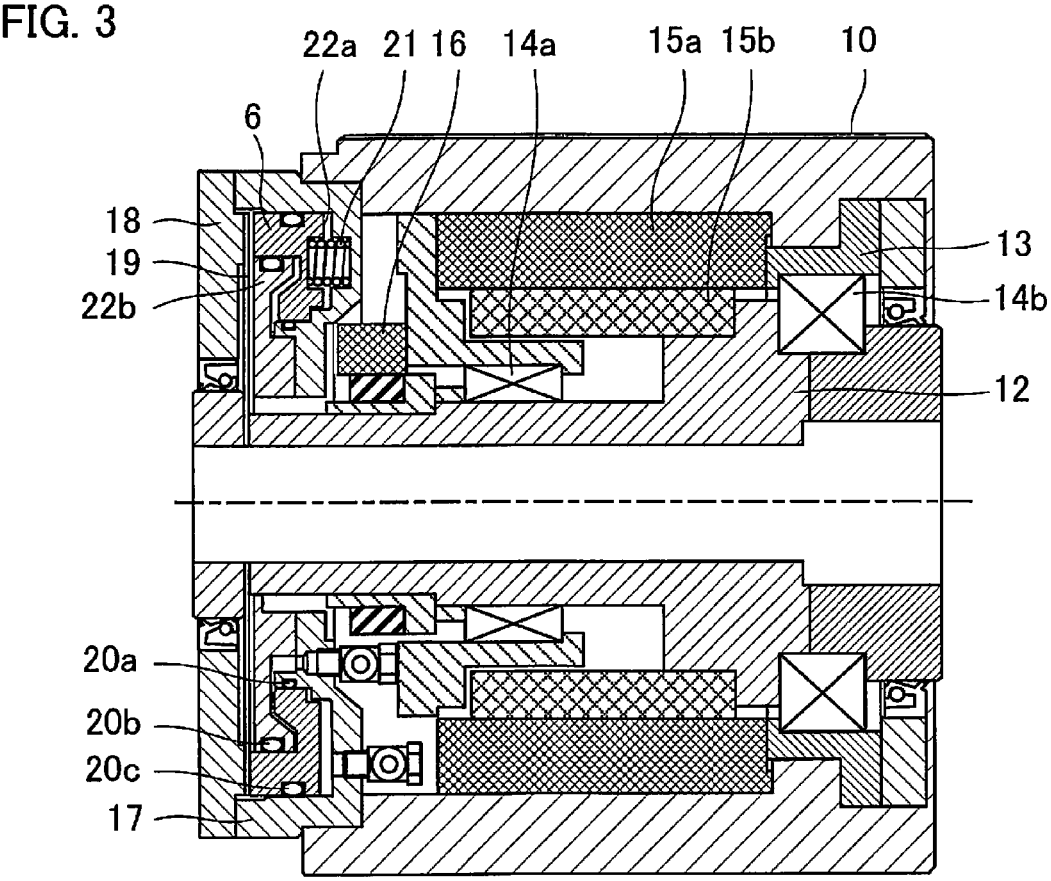
FIG. 3 is a skeleton diagram illustrating a structure of an embodiment of the rotation table of the invention.

As illustrated in FIG. 3, electric components such as the motor 15 (the stator 15a and the rotor 15b) and the encoder 16 are accommodated in the casing 10 of the rotation table 3, and a clamping mechanism which is driven by air is provided inside the casing 10. Further, as illustrated in FIG. 2, air used to apply an air purging pressure for preventing coolant or foreign matter from intruding into a machine or air used in the clamping mechanism is supplied from a supply port provided in the casing 10.

A first example of the air flow passage inside the rotation table 3 of FIG. 3 will be described with reference to FIG. 4.

Similarly to the related art, an air purging pressure is applied into the rotation table 3. The purging air is supplied from the outside of the rotation table 3 through the flow passage 26. A supply port 26a is formed in the course of the flow passage 26 so that the purging air is supplied from partly the air used to drive the clamping mechanism.

Figure 4:
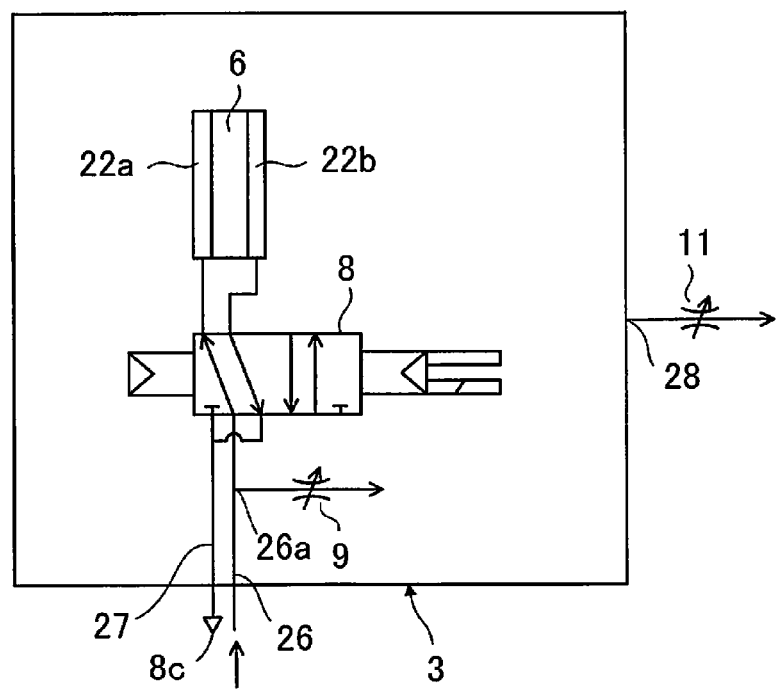
FIG. 4 is a schematic diagram of a first example of an air flow passage inside the rotation table of FIG. 3.

In the first example of the air flow passage illustrated in FIG. 4, the supply port 26a is provided with a needle valve 9 which adjusts the amount of air flowing into the machine, the casing 10 is provided with a drain hole 28 which discharges the air supplied for the purging operation, and the drain hole 28 is also provided with a needle valve 11 similarly to the supply port 26a. Accordingly, the amount of air flowing out of the drain hole may be adjusted. When the inflow amount and the outflow amount are adjusted such that the air purging pressure inside the machine is maintained at about 0.01 MPa being a pressure higher than the atmospheric pressure, the intrusion of a cutting fluid or cutting chips into the machine is prevented during the machining process.

As the difference from the flow passage structure of the related art, the flow passage is formed so that the air discharged from the clamping mechanism does not pass through the machine to which the purging air is applied. In the case of the clamping operation, the air which is discharged from the air supply port provided in the casing 10 reaches the clamping pressure chamber 22a while passing through the electromagnetic valve 8, and the air which is discharged from the unclamping pressure chamber 22b passes through the electromagnetic valve 8 and is discharged to the outside of the rotation table 3 through the flow passage 27 without passing through the inside of the machine to which the air purging pressure is applied as illustrated in FIG. 4 (see an electromagnetic valve discharge port 8c).

A second example of the air flow passage inside the rotation table 3 of FIG. 3 will be described with reference to FIG. 5.

Figure 5:
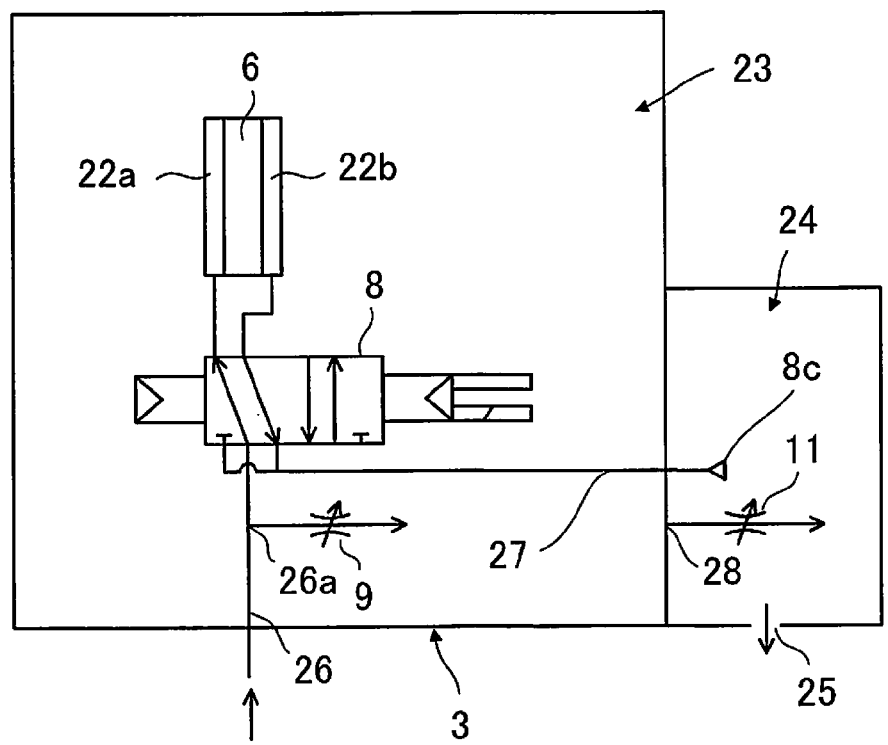
FIG. 5 is a schematic diagram of a second example of the air flow passage inside the rotation table of FIG. 3.

In the second example of the air flow passage illustrated in FIG. 5, the inside of the rotation table 3 is divided into a first chamber 23 to which the air purging pressure is applied and a second chamber 24 to which the air purging pressure is not applied. The air purging structure of the first chamber 23 to which the air purging pressure is applied is the same as that illustrated in FIG. 4 (as the first example of the air flow passage). In FIG. 5, the needle valve 11 which adjusts the air purging is directed toward the second chamber 24 to which the air purging pressure is not applied, but the needle valve may be directed toward the outside of the rotation table instead of this configuration.

In the case of the clamping operation, the air which is discharged from the unclamping pressure chamber 22b is not discharged to the outside of the rotation table 3, but is discharged to the second chamber 24, to which the air purging pressure of the rotation table 3 is not applied, through the flow passage 27 (see the electromagnetic valve discharge port 8c). The second chamber 24 to which the air purging pressure is not applied is provided with a small hole 25, and the second chamber 24 has the atmospheric pressure substantially equal to the pressure outside the rotation table 3 through the small hole 25. Since the second chamber 24 to which the air purging pressure is not applied is provided, coolant or coolant mist does not easily intrude into the first chamber 23 to which the air purging pressure is applied.

In any case, in the case of the related art, air discharged from the unclamping pressure chamber 22b is discharged into the rotation table 3. But, in the case of the present invention, the unclamping pressure chamber 22b is normally connected to the atmospheric pressure outside the rotation table, and the discharge flow passage is separated from a space to which the air purging pressure is applied. For this reason, the discharge of air is not disturbed by the air purging pressure, the operation of the piston 6 is also stable regardless of the frequency of the clamping operation, and hence the highly reliable rotation table may be obtained.

The invention claimed is:

1. A rotation table, comprising:
   a single casing;
   a rotation shaft that is rotatably supported by the single casing; and
   a clamping mechanism that is driven by air so as to clamp the rotation shaft,
   wherein
   a workpiece is attached to the rotation shaft at one end thereof, and an air purging pressure is applied into the single casing so as to prevent a cutting fluid or foreign matter from intruding into the single casing,
   an electromagnetic valve for operating the clamping mechanism is disposed inside the single casing of the rotation table, and
   the clamping mechanism and the electromagnetic valve are disposed inside the single casing, and
   wherein the rotation table further comprises a flow passage that connects the clamping mechanism to an outside of the single casing through the electromagnetic valve and discharges air discharged from the clamping mechanism to the outside of the single casing.

2. A rotation table, comprising:
   a first casing;
   a rotation shaft that is rotatably supported by the first casing; and
   a clamping mechanism that is driven by air so as to clamp the rotation shaft,
   wherein a workpiece is attached to the rotation shaft at one end thereof, and an air purging pressure is applied into the first casing so as to prevent a cutting fluid or foreign matter from intruding into the first casing,
   wherein the rotation table further comprises a second casing which is provided adjacent to the first casing and to which the air purging pressure is not applied, and the second casing includes a hole communicating to an outside of the second casing, and
   wherein the rotation table further comprises a flow passage which connects the clamping mechanism to the second casing and discharges air discharged from the clamping mechanism to the second casing.

3. The rotation table according to claim 2, further comprising:
   an electromagnetic valve configured to operate the clamping mechanism, wherein the electromagnetic valve is disposed inside the first casing.

* * * * *